(No Model.)
F. H. KELLEY.
PHOTOGRAPHIC SHUTTER.
No. 534,440. Patented Feb. 19, 1895.
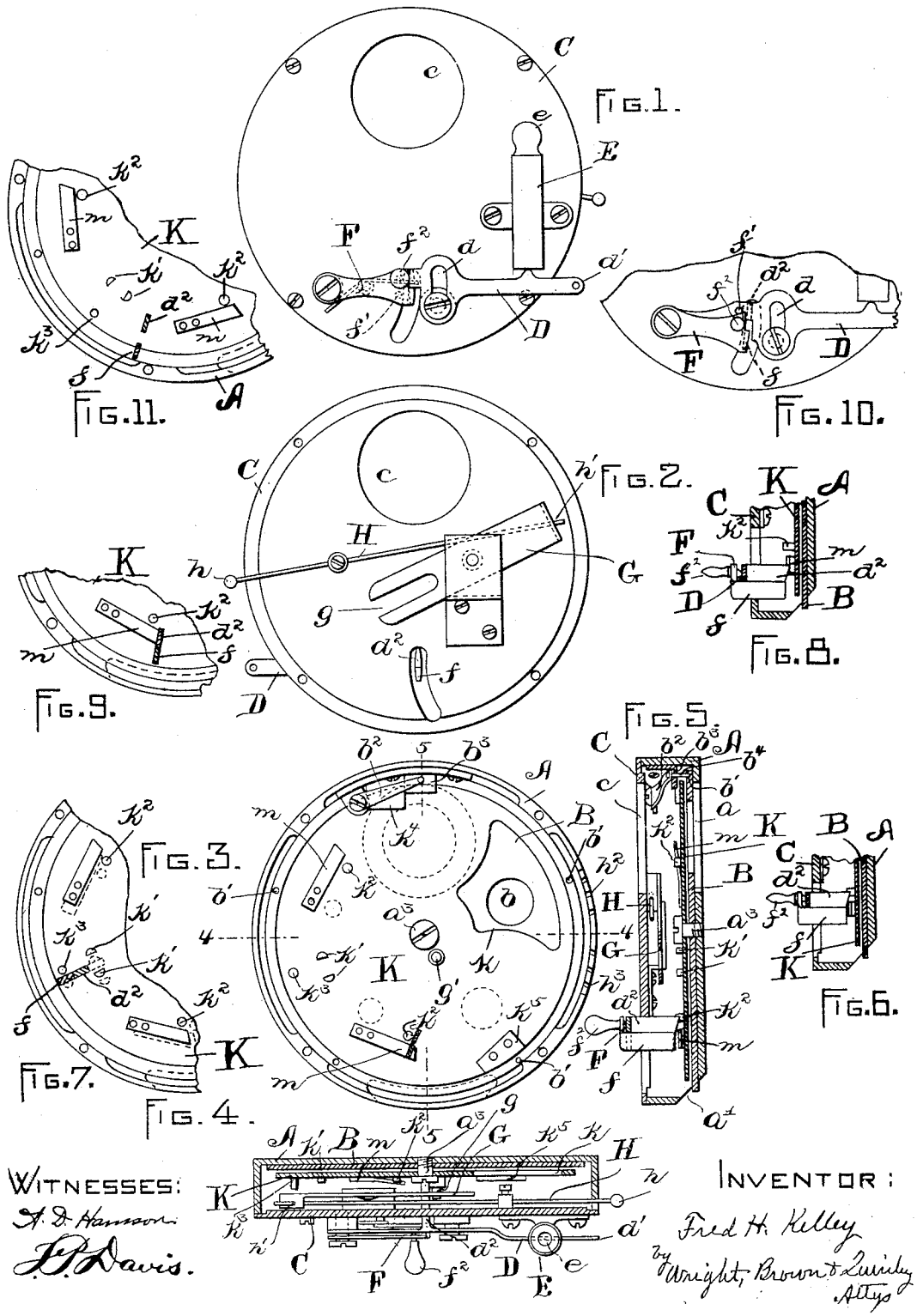
WITNESSES:
A. D. Hanson
S. P. Davis
INVENTOR:
Fred H. Kelley
by Wright, Brown & Quinby
Attys

UNITED STATES PATENT OFFICE.

FRED H. KELLEY, OF BOSTON, MASSACHUSETTS, ASSIGNOR TO THE EUROPEAN BLAIR CAMERA COMPANY, LIMITED, OF LONDON, ENGLAND.

PHOTOGRAPHIC SHUTTER.

SPECIFICATION forming part of Letters Patent No. 534,440, dated February 19, 1895.

Application filed September 28, 1894. Serial No. 524,335. (No model.)

*To all whom it may concern:*

Be it known that I, FRED H. KELLEY, of Boston, in the county of Suffolk and State of Massachusetts, have invented certain new and useful Improvements in Photographic Shutters, of which the following is a specification, and which improvements are for the most part shown and described in British Patent No. 7,398, of May 19, 1894, granted to the European Blair Camera Company, Limited, as a communication from me.

My invention relates to that class of camera shutters in which a pivotal shutter-disk is thrown from one position to another by the straightening of a spring rod or wire, and the invention has in view certain improvements calculated to render such a device more sure and certain in its action than its predecessors.

Of the accompanying drawings which illustrate an embodiment of the invention and form part of this specification, Figure 1 is an external front view. Fig. 2 is a view of the inside of the cover inverted. Fig. 3 is a view of the shutter, the cover being removed, and certain detent-fingers appearing in section. Fig. 4 is a section on line 4—4 of Fig. 3. Fig. 5 is a section on line 5—5 of Fig. 3. Fig. 6 is a sectional view similar to Fig. 5, illustrating a certain detent-lever in the act of releasing the shutter-disk. Fig. 7 is a view similar to Fig. 4, illustrating the manner of co-action of the detent-fingers with an intermediate set of stop-pins. Figs. 8 and 9 are views similar to Figs. 6 and 7, illustrating the action of a spring stop-piece in conjunction with the detent-fingers. Fig. 10 is a view similar to Fig. 1, illustrating the adjustment of the detent-lever for instantaneous exposures. Fig. 11 is a view similar to Fig. 7, illustrating the relation of the detent-fingers to the intermediate stop-pins when the said fingers are adjusted for instantaneous exposures.

A is the casing of circular form having a circular opening, $a$, by which it can be fixed on the lens tube of a camera, and B is a diaphragm disk centered on a stud, $a^3$, fastened in one side of the casing, A, and having through it openings, $b$, of several different sizes.

Part of the side and bottom of the casing, A, is cut away at $a'$, so that the thumb or finger can reach the edge of the disk, B, to turn it partly round, so as to bring one or another of the diaphragm openings, $b$, into coincidence with the lens opening. Near the edge of the disk, B, are holes or depressions, $b'$, one in line with the center of each diaphragm opening, $b$, and there is fixed to the casing a spring, $b^2$, with a point, $b^4$, fitted to enter any of the holes, $b'$. When the finger or thumb is applied to turn the disk, B, the engagement of the point, $b^4$, in one of the holes, $b'$, causes the operator to feel a little resistance by which he knows that one of the diaphragm openings, $b$, is in line with the lens opening.

The casing, A, has a cover, C, with a lens opening, $c$. On the outside of the cover, C, is pivoted a spring-actuated lever, D, which can be moved as far as its slot $d$, will permit, either by the finger applied to its end, $d'$, or by the movement of a plunger in a small cylinder, E, to the end of which at, $e$, a flexible tube can be attached so that the operator, by squeezing a bulb, can cause the plunger of the cylinder, E, to push back the lever, D. From the lever, D, a stud or finger, $d^2$, projects through a curved slot into the interior of the casing. On the same pivot with the lever, D, is pivoted a resilient lever, F, having a stud or finger, $f$, projecting from it into the interior of the casing, this stud meeting the stud, $d^2$, except when the lever, F, is pulled down so that a gap is left between the studs, $d^2$ and $f$, as shown in Fig. 11.

The lever, F, is held with certain firmness in the one or the other of its two positions by the engagement of a stud, $f^2$, in one or the other of two shallow holes, $f'$, in the face of the lever, D, but the engagement of the stud in the hole does not prevent the operator from moving the lever, F, whose resilience permits disengagement of the stud from the hole.

Inside, the cover, C, has pivoted on it a lever, G, having a slot, $g$, and it has also pivoted on it an elastic wire, H, having at its end a knob, $h$, which projects beyond the side of the casing, and has its other end engaged at $h'$, in a hole in a bent-up lip of the lever, G. Where the wire, H, passes through the side of the casing, is a long slot with several notches, $h^3 h^3$, in any of which the wire, H, can be engaged.

On the back of the diaphragm disk, B, is centered the shutter disk, K, having through it the opening, $k$, shown in Fig. 3. A stud, $g'$, projecting from the shutter, K, is engaged in the slot, $g$, of the lever, G, and on the shutter are also several projecting pins, $k'$, $k^2$, and $k^3$, which act as stops in conjunction with the studs, $d^2$ and $f$, and two stops, $k^4$, $k^5$, which meet a fixed stop, $b^3$, when the shutter, K, turns to its farthest extent in either direction. The operator by moving the knob, $h$, until he engages the wire, H, in one or the other of the notches, $h^2$ or $h^3$, bends the wire, H, between its pivot and its end, $h'$, and thus puts on the lever, G, a strain tending to turn it, but as the stud, $g'$, is engaged in the slot of the lever, G, and as the shutter disk, K, is stopped by one of the pins, $k^2$, bearing against the finger, $d^2$, (see Figs. 3 and 4) there is no movement until the operator by moving the lever, D, either by the finger applied to the end, $d'$, or by pneumatically forcing out the plunger of the cylinder, E, withdraws the finger, $d^2$, from the path of the pin, $k^2$, and thereupon the wire, H, unbending causes the shutter disk, K, to turn rapidly until it is stopped by the pin, $k^3$, coming against the finger, $f$, (see Fig. 7) its opening, $k$, being brought into coincidence with the lens opening of the diaphragm. Then, on releasing the lever, D, the finger, $d^2$, passes between the two pins, $k'$, and the finger, $f$, clears the pin, $k^3$, a slight movement of the disk then taking place which carries one of the pins, $k'$, against the finger, $d^2$, and the pin, $k^3$, beyond the finger, $f$. (See dotted lines in Fig. 7.) When it is desired to close the lens opening, the lever, D, is again pulled back releasing the finger, $d^2$, from between the pins, $k'$, whereupon the shutter disk completes its stroke moving its opening, $k$, away from the lens opening.

When a very rapid, approximately instantaneous, opening and closing of the lens opening is desired, the lever, F, is pulled down removing the finger, $f$, from the finger, $d^2$, so that when the lever, D, is moved the stud, $f$, is taken beyond the path of the pin, $k^3$, (see Fig. 11,) and consequently the shutter disk, instead of stopping in an intermediate position with its opening, $k$, over the lens opening, makes its full stroke, opening for an instant and then closing the lens aperture.

The wire, H, may be more or less strained by engaging it in one of the notches, $h^2$ $h^3$, nearer to or farther from the end of the slot, the greater or less rapidity of the movement of the shutter being thus determined. It is to be understood that having effected one complete movement of the shutter disk, K, by engaging the wire, H, in one of the notches, $h^2$, the next movement of the shutter, which is a return movement, is effected by engaging the wire, H, in one of the other notches, $h^3$.

In order to prevent backward movement of the shutter disk when the detent-lever is down, I provide auxiliary stops in the form of flat springs, $m$, fastened to the disk and extending alongside the pins, $k^2$. When the disk is thrown to closed position one of these springs rides under the finger, $d^2$, and is depressed thereby until it passes by it, when the said spring moves out behind the finger and acts as a stop to prevent any backward movement of the disk. (See Figs. 8 and 9.) When the lever is released and moves back to its normal position the finger, $d^2$, escapes the spring (see Figs. 3 and 4), and the pin, $k^2$, comes to bear against this finger after a slight movement of the disk when the spring, H, is put under tension. This slight movement carries the spring by the finger and when the lever is moved down, the finger, $d^2$, rides across the spring depressing the same, as illustrated in Fig. 6, the said finger being beveled to permit this action. The other finger, $f$, is shorter than the finger, $d^2$, so as not to touch the springs, and the pin, $k^3$, is made correspondingly longer than the other pins.

Having thus described a way of embodying my invention, what I claim is as follows:

1. A camera-shutter comprising in its construction a suitably apertured casing, a shutter-disk rotatively supported in said casing and having an aperture for registry with those of the casing, said disk carrying a crank-pin and stop-pins; a slotted arm engaging said crank-pin and pivoted to the casing; a spring rod or wire pivoted to the casing intermediate of its ends and having one end in engagement with the said slotted arm and the other end projecting from the casing, the latter having provision for engagement of the spring when put under tension; and a detent for engagement with the stop-pins on the disk.

2. In a camera-shutter employing a pivotal shutter-disk and a motive spring therefor, an arrangement of stops on the disk consisting in two stops for holding the disk closed at the limit of its movement in opposite directions, and three intermediate stops for holding the disk centrally in open adjustment in combination with a detent having a fixed finger for engagement with the two outer stops and with two of the intermediate stops, and a movable finger for engagement with the third intermediate stop.

3. In a camera-shutter employing a pivotal shutter-disk and a motive spring therefor, an arrangement of stops in the disk consisting in two stops for holding the disk closed at the limit of its movement in opposite directions, and three intermediate stops for holding the disk centrally in open adjustment in combination with a pivoted spring-held detent having a fixed finger for co-action with the two outer stops and with two of the intermediate stops, and an arm pivoted concentrically with the detent and having a finger for co-action with the third intermediate stop, said arm being adjustable on the detent to throw its finger into and out of operative position.

4. In a camera-shutter, the combination of a detent, and a spring-impelled shutter-disk having stop-pins for abutment against the detent and springs alongside said pins adapted to pass under the detent and move out behind the same, for the purpose described.

5. In a camera-shutter, the combination of a detent-lever having a finger with a beveled end; and a spring-impelled shutter-disk having stop-pins to co-act with said finger in holding the disk, and flat springs extending alongside the said pins and adapted to pass under the finger and move out behind the same to prevent backward movement of the disk, substantially as described.

In testimony whereof I have signed my name to this specification, in the presence of two subscribing witnesses, this 25th day of September, A. D. 1894.

FRED H. KELLEY.

Witnesses:
HORACE BROWN,
FRANK PARKER DAVIS.